Oct. 22, 1957 W. E. DAILY 2,810,881
AUTOMATIC CABLE TESTER
Filed Dec. 14, 1956 2 Sheets-Sheet 1

INVENTOR.
WILLIAM E. DAILY
BY
*J. F. Sheehan*
ATTORNEYS

INVENTOR.
WILLIAM E. DAILY

United States Patent Office 2,810,881
Patented Oct. 22, 1957

2,810,881

AUTOMATIC CABLE TESTER

William E. Daily, Oaklyn, N. J.

Application December 14, 1956, Serial No. 628,472

6 Claims. (Cl. 324—51)

(Granted under Title 35, U. S. Code (1952), sec. 266)

The invention described herein may be manufactured and used by or for the Government of the United States of America for governmental purposes without the payment of any royalties thereon or therefor.

The present invention relates to an automatic apparatus for testing cables, which are comprised of a plurality of wires, for determining the existence of faults therein. The faults or failures for which the apparatus is adapted to test are concerned with the conductive efficiency, such as, short circuits, open circuits or continuity of the cable wiring. The device operates to indicate the wire or wires which have failures therein.

The invention embodies a small compact housing which is readily portable by an operator for testing electrical equipment located at various stations in a plant or on shipboard. The device is especially designed to give visual indication of the particular faults that exist in switchboard wiring and to also indicate the wire which is at fault.

Various assemblies of electrical and electronic equipment are employed on ships, aircraft, etc. wherein the various circuits employed require the use of a number of cables, each of which is comprised of a multiplicity of wires. In order to insure the proper operation of such equipment and to determine the existence of faults or defects in the cables which would render the equipment ineffective or inoperative, it is essential that the individual wires in each cable be checked. This may be done manually by individually testing each wire with an appropriate hand testing instrument; however, this procedure is a tedious and time-consuming undertaking and such testing is subject to operator errors, and as a result, one or more individual wires may be missed during the testing operation.

The broad object of the present invention is to provide an automatic testing apparatus whereby cables having a plurality of wires may be automatically analyzed or tested to determine faults simply by connecting a cable to be tested with the testing circuitry contained within the testing device.

Another object of the invention is to provide a testing device which incorporates a particular pulsing circuit for effecting the testing operations.

Still another object is to utilize a pulsing circuit which is arranged to vary the impulse timing.

A more specific object is to provide testing device which is of unitary and compact design and readily transported by an operator to the location of the equipment to be tested.

Further objects and advantages of the invention will become more apparent from the following detailed description and accompanying drawings; wherein.

Figure 1:
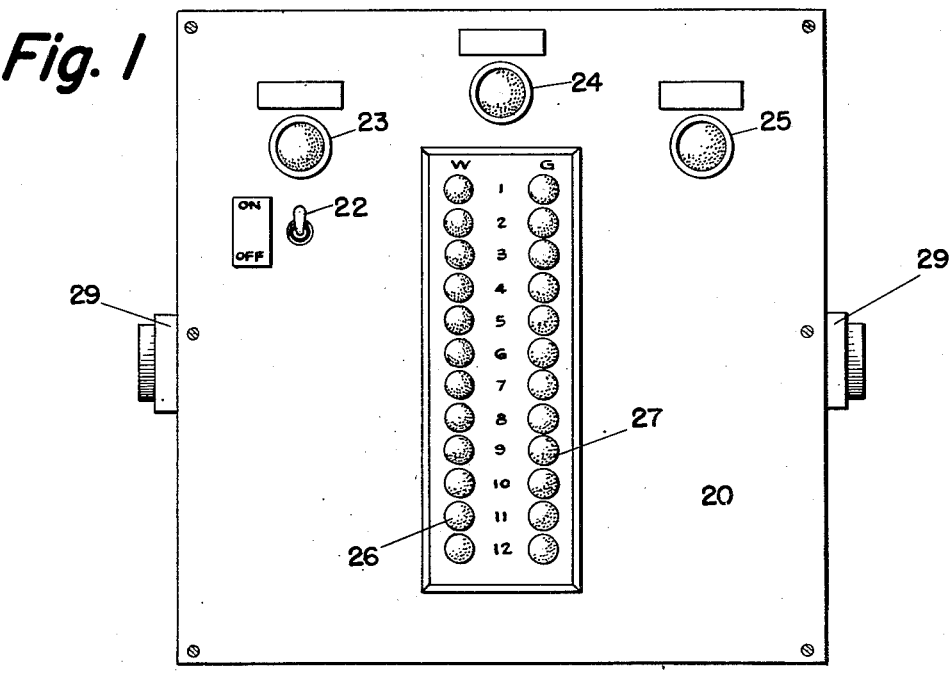
Fig. 1 is a front elevational view of the portable testing unit showing the various visual indicators associated with the front panel thereof.
Figure 2:
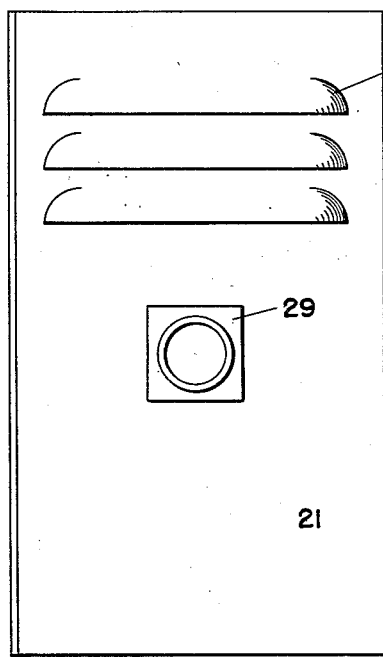
Fig. 2 is a side elevational view of the unit.

Referring to Figs. 1 and 2, the housing is formed with a rectangular front panel 20 and a relatively narrow side wall 21. The top, bottom and rear walls are arranged to provide an enclosure for the electrical circuitry which will be described in detail in connection with Fig. 3.

The front panel is provided with a toggle switch 22, open circuit indicator light 23, short circuit indicator light 24, and a test indicator light 25, as well as two rows of wire indicator lights 26 and 27. The side wall 11 is louvered at 28 and other walls of the housing may also be louvered for ventilation purposes. Sockets 29—29 are provided in the sidewalls and are connected with the electrical equipment within the testing device and provide connections for the cable wires which are to be tested. The lights 23, 24 and 25 will preferably be of different colors to give ready visual indication to the operator of the type of fault while each row of wire indicator lights 26 and 27 will be numbered 1 through 12 as indicated and the rows will be of contrasting colors such as white (W) and green (G).

The present device is designed particularly for testing the wires of one set or row of switchboard cables containing 12 wires against the wires of another set of cables where, as is customary, wires of one set are joined with those of another set at terminal posts. Test cables comprising twelve wires each were used to connect each socket 29 of the testing device with the terminal posts in making the test.

Figure 3:
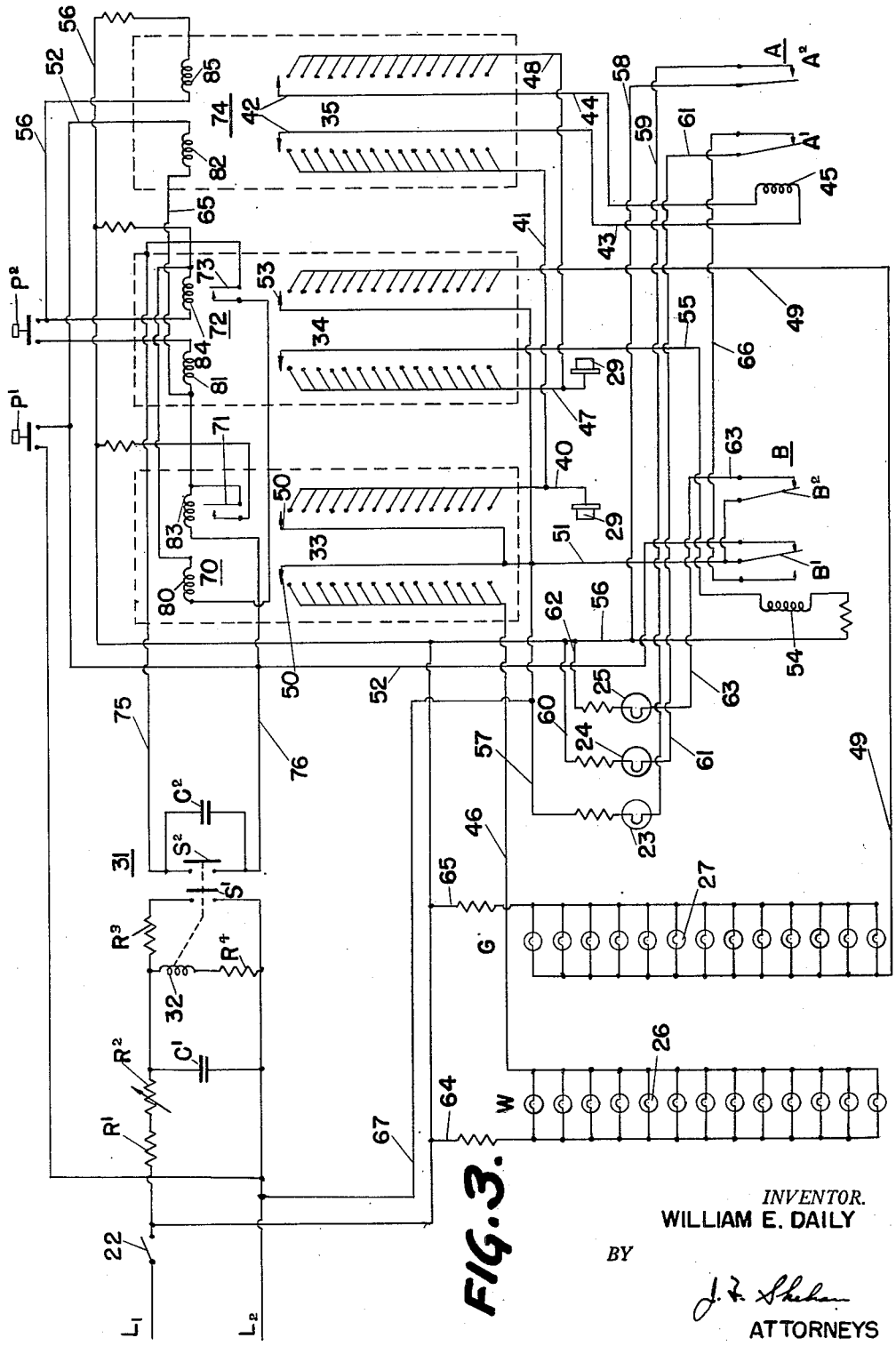
Fig. 3 is a diagram of the electrical circuitry with visual identifying indicators associated therewith.

Referring to Fig. 3 for an explanation of the circuitry of the apparatus, power is supplied by lines $L_1$ and $L_2$ and closing the line switch 22 will transmit a charge to a pulsing circuit indicated generally at 31 which, as shown, includes capacitors, resistors and switches. The velocity of the charge to the capacitor $C^1$ is controlled by a fixed resistor $R^1$ and a variable resistor $R^2$ which provide for varying the pulse timing as desired. A double pole single throw type switch is operated by a relay 32 and the pole $S^1$ of the switch connects a resistor $R^3$ across the terminals of the capacitor $C^1$ to provide for completely discharging the capacitor while the other pole $S^2$ of the switch closes the circuit to operate selector relays of selectors 33, 34 and 35 as will be described later. The capacitor $C^2$ is provided as a means for preventing damage to the switch structure by overheating while a suitable resistor $R^4$ is provided to control the current flow to the relay 32.

Each of the selectors 33, 34 and 35 is shown by way of example as having 15 points contacts. It will be understood that only twelve are necessary for the present explanation. One set of contacts of the selector 33 is connected with one of the sockets 29 of the testing instrument through line 40 and also to one set of contacts of the selector 35 through line 41. The arm 42 of the selector 35 is connected by lines 43 and 44 directly to the coil 45 of an open circuit relay A having double pole switches $A^1$ and $A^2$. The other set of contacts of selector 33 is connected to the W wire indicator lights by line 46. One set of the contacts of selector 34 is connected to the other socket 29 of the testing instrument through line 47 and to the other set of contacts of selector 35 through line 48. The other set of contacts of switch 34 are connected directly to the G wire indicating lights through line 49.

A short circuit relay B is provided and has doublethrow switches $B^1$ and $B^2$. The arm 50 of selector 33 is directly connected through line 51 to switches $B^1$ and $B^2$ and the circuit is completed to a push button starting switch $P^1$ through switch $B^1$ and line 52 and to test indicating light 25 through switch $B^2$. The arm 53 of selector 34 is connected to coil 54 of relay B by line 55 for operating switches B¹ and B² and the circuit is completed by line 56 to a release push button switch P² by line 56.

The arm 53 of selector 34 and the arm 50 of selector 33 are both connected to open circuit indicator light 23 by line 57, as shown, and lines 58 and 59 complete the circuit of light 23 through switch A² of the relay A with line 56. Short circuit indicator light 24 is connected to line 56 by line 60 and the circuit is completed to switch A¹ of relay A by line 61 and to one side of switch B¹ by line 66. Test indicator light 25 is also connected to line 56 by line 62 and to switch B² of relay B by line 63. The W and G wire indicating lights are in circuit between line 56 and power line L₁ by lines 64 and 65, and line 57 is connected to power line L₂ by line 67.

The selector relays 70, 72 and 74 are provided respectively with stepping coils 80, 81 and 82 and release coils 83, 84 and 85 for controlling the advance and return movement of the arms 50, 53 and 42 over the selector switches. These coils will alternately be energized by the pulsing circuit through the operation of the push bottons P¹ and P².

*Operation*

In the use of the testing instrument, after the sockets 29 of the instrument are connected in circuit with the cable wires to be tested, the switch 22 is moved to the "on" position and the push button P¹ is operated to start the advance movement of the arms 50, 53 and 42 to the first contact of selectors 33, 34 and 35. The arm 42 of selector 35 will operate in synchronism with arm 53 and thus these arms will rest on similar contacts of the selectors 34 and 35 while the contact arm 50 of selector 33 will operate independently. The movement of arm 50 is controlled by operation of the P¹ push button while the movement of the other arms is controlled by the P² push button.

When the arm 50 is in contact with the first contact of selector 33, the #1 (W) light and also the test indicator light 25 will be on to indicate that a test is being made through the first contact of selector 33. The arm 53 of selector 34 will also be in contact with its first contact and consequently the #1 (G) light will be on simultaneously with the #1 (W) light to indicate that a test is being made between the first wire which is in circuit with the first contact of selector 33 and the first wire which is in contact with the first contact of selector 34. If a circuit is established from the first contact of selector 33 through the test cable, the wires being tested and back to the first contact on selector 34, current will flow through the coil 54 of relay B and the switch B¹ will be moved from its shown closed position to its other contact and the light 24 will be lighted through the normally closed switch A¹ to indicate a short or a completed circuit.

Operation of the release button P² will cause the arm 53 to scan the contacts of selector 34 and effect a check of each of the wires in circuit with these contacts in combination with the first wire of selector 33. At the end of this check the arm 53 will return from its number 12 contact to the first contact of selector 34 and the test is continued by operating push button P¹ to advance arm 50 to the second contact of selector 33 and operation of button P² will cause the arm 53 to again scan the contacts of selector 34 and check the wires against the second wire in circuit with the second contact of selector 33 for short circuits and continuity.

If no circuit is established between the contacts of selector 33 and contacts of selector 34, current will flow to the coil 45 of the A relay through the arm 42 of the selector 35 and the normally closed switch A¹ will be opened and the test will stop while the normally open switch A² will close and the light 24 will be on to indicate that there is an open circuit. The arm 42 of selector 35, since it moves in synchronism with the arm 53 of selector 34, functions to operate the switches A¹ and A² through the coil 45.

It will be understood that the (W) and (G) lights will be aligned in parallel rows as shown and consecutively numbered from 1 to 12 to provide for giving a visual indication of the wires of the sets being tested. When a wire being tested is found to be defective, the machine will automatically stop and if the machine stops when (W) and (G) lights are at different numbers and light 24 is on, this will indicate a short. If the machine stops when the (W) and (G) lights are at the same number and light 24 is on, it indicates a complete circuit. If light 23 is on, this indicates the trouble is in the continuity of the wiring or an open circuit.

Obviously many modifications and variations of the present invention are possible in the light of the above teachings. It is therefore to be understood that within the scope of the appended claims the invention may be practiced otherwise than as specifically described.

What is claimed is:

1. Apparatus for testing switchboard cables in which the wires of one set of cables are joined to the wires of another set of cables at terminal points which comprises a housing having a pair of sockets communicating through the housing wall, each for receiving connections to the switchboard terminals to test the wires of one set of cables against the other, said housing having electrical circuitry therein which includes a first selector having a plurality of contacts and a first contact arm, a second selector having a plurality of contacts and a second contact arm, relay means for controlling the movement of each contact arm over the contacts of its selector, a power source, a pulsing circuit in series between the power source and said relay means, a first switch means and a first fault indicating light between the first selector arm and the pulsing circuit, a second switch means and a second fault indicating light between the second selector arm and the pulsing circuit, a first group of wire indicating lights, each light being numbered and connected with a corresponding contact of the first selector, a second group of wire indicating lights, each light being numbered and connected with a corresponding contact of the second selector, manual means for connecting the pulsing circuit to the relay means for effecting the movement of each contact arm over the contacts of each selector, said first switch means being operable by the second contact arm to energize the first fault indicating light when a circuit is established between contacts of the first and second selectors and said second switch means being operative to energize the second fault indicating light when no circuit is established between the contacts of the first and second selectors, and said wire indicating lights of each group being sequentially energized in accordance with the advance of each contact arm and indicative of a short circuit when non-corresponding lights are energized simultaneously with the first fault indicating light and indicative of a completed circuit when corresponding lights are energized simultaneously with the second fault indicating light.

2. Apparatus as in claim 1 further characterized by said first and second group of wire indicating lights being disposed in parallel alignment in the housing wall and each group being similarly and consecutively numbered providing horizontally aligned and corresponding indicating lights.

3. Apparatus as in claim 1 further characterized by the pulsing circuit including a capacitor, resistance means for varying the charge to the capacitor for controlling the pulse timing and a relay actuated switch which is operative in accordance with the pulse timing.

4. Apparatus as in claim 1 further characterized by the manual means comprising a first and second switch and the relay means comprising a first coil operable by the first switch to advance the arms over the selector contacts to the last contact and a second coil operable by the second switch to return the contacts from the last contact.

5. Apparatus for testing switchboard cables in which the wires of one set of cables are joined to the wires of another set of cables at terminals which comprise a housing having a pair of sockets communicating through the housing wall, each for connection to the switchboard terminals to test the wires of one cable against the wires of another cable, said housing having circuitry therein which includes a first selector having a plurality of contacts and a first contact arm, a second selector having a plurality of contacts and a second contact arm, relay coils for controlling the movement of each contact arm over the contacts of its selector, a power source, a pulsing circuit in series between the power source and said relay coils, a first fault indicating means between the first selector arm and the pulsing circuit, a second switch means and a second fault indicating means between the second selector arm and the pulsing circuit, a first group of wire indicating means in circuit with the contacts of the first selector for indicating the wire of one set which is being tested, a second wire indicating means in circuit with the contacts of the second selector for indicating the wire of the other set which is being tested, manual means for connecting the pulsing circuit to the relay means to supply pulses for effecting the advance of each contact arm to the first contact of each selector, other manual means for independently advancing the second contact arm from the first contact of the second selector over the remaining contacts while the first contact arm rests on the first contact of the first selector and a line connecting said first and second contact arms with the pulsing circuit whereby each of said first and second switch means is effective to interrupt the supply of power to the pulsing circuit when either short or open circuit indicating means is operated.

6. Apparatus as in claim 5 further characterized by said first and second switch means being respectively normally closed and open whereby only the first fault indicating light when circuit is established between the contacts of the first and second selectors is energized by the first switch means, a third selector, a third contact arm movable in synchronism with the second contact arm over the contacts of the third selector, a coil in circuit with the contacts of the third selector and operable by the third contact arm when no circuit is established between contacts of the first and second selectors to open the first switch means and close the second switch means whereby only the second fault indicating light is energized.

References Cited in the file of this patent

UNITED STATES PATENTS

| 2,584,680 | Doncyson | Feb. 5, 1952 |
| 2,723,368 | Curtis | Nov. 8, 1955 |